United States Patent [19]

Ringel et al.

[11] 4,151,999
[45] May 1, 1979

[54] SHAFT SEAL

[75] Inventors: Reginald K. Ringel, Decatur, Ill.; Kevin G. Forster, Blue Grass, Iowa; Harold L. Reinsma, Dunlap, Ill.

[73] Assignee: Caterpillar Tractor Co., Peoria, Ill.

[21] Appl. No.: 882,303

[22] Filed: Feb. 28, 1978

Related U.S. Application Data

[63] Continuation-in-part of Ser. No. 743,834, Nov. 22, 1976, abandoned.

[51] Int. Cl.² ............................. F16J 9/06; F16J 5/24
[52] U.S. Cl. ................................................. 277/165
[58] Field of Search .................. 277/165, 176, 188 R, 277/188 A

[56] References Cited

U.S. PATENT DOCUMENTS

| | | | |
|---|---|---|---|
| 2,968,501 | 1/1961 | Tisch | 286/26 |
| 3,328,041 | 6/1967 | Bloom et al. | 277/165 |
| 3,341,210 | 9/1967 | Vick | 277/165 |
| 3,418,001 | 12/1968 | Rentschler et al. | 277/165 |
| 3,663,024 | 5/1972 | Traub | 277/165 |
| 3,727,925 | 4/1973 | Jones | 277/165 |
| 3,814,445 | 6/1974 | Bitzan | 277/165 |
| 3,860,250 | 1/1975 | Lundquist | 277/165 |
| 3,920,252 | 11/1975 | Dechavanne | 277/165 |
| 3,990,712 | 11/1976 | Dechavanne | 277/165 |
| 3,999,767 | 12/1976 | Sievenpiper | 277/165 |
| 4,067,584 | 1/1978 | Hunger | 277/165 |

*Primary Examiner*—Robert I. Smith
*Attorney, Agent, or Firm*—John W. Grant

[57] ABSTRACT

A shaft seal assembly has an elastomer load ring seated in an annular groove provided in an organic plastic sealing ring. The sealing ring is constructed to provide greater unit loading at the outer edges of the sealing surface than at the remainder of the sealing surface. The end faces of the sealing ring are free from contact with adjacent structure.

3 Claims, 1 Drawing Figure

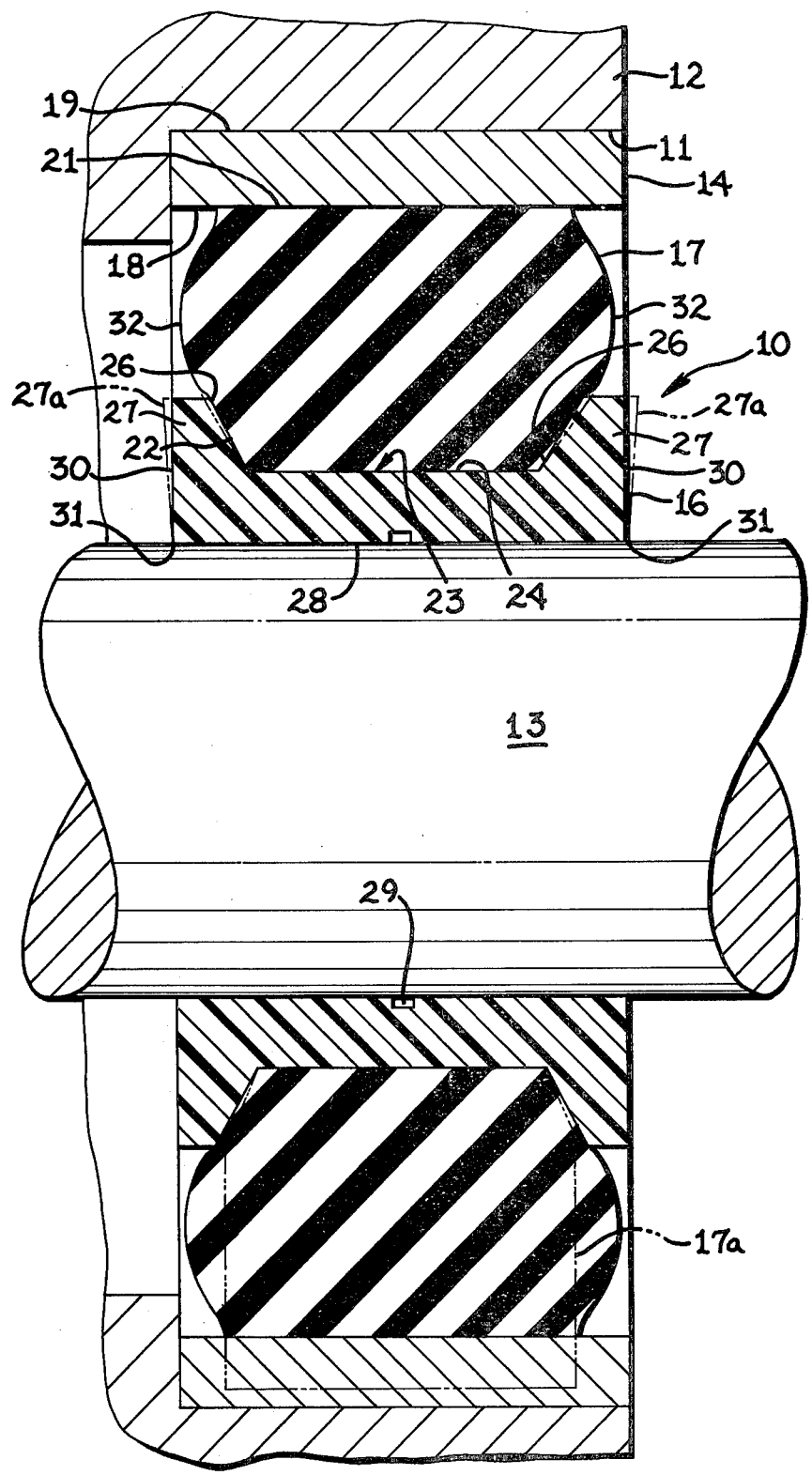

4,151,999

SHAFT SEAL

CROSS-REFERENCE TO RELATED APPLICATIONS

This application is a continuation-in-part of application Ser. No. 743,834 filed on Nov. 22, 1976 and now abandoned.

BACKGROUND OF THE INVENTION

This invention relates to seals and more particularly to a shaft seal having end faces free from contact with adjacent structure.

Many seal configurations are available for sealing against a rotating or sliding shaft for retaining liquids within a chamber housing a bearing while excluding extraneous material. In most cases a lubricant is necessary for proper sealing action between the seal and the shaft, such lubricant normally being supplied from within the chamber. In the case of nonlubricated or dry running bearings where lubricants are not present, it is still desirable to have a seal to protect these bearings from abrasive material to prolong their operational life. Such a seal should have good abrasive resistant qualities and in many applications must be capable of sustaining radial shaft deflections. Furthermore, since those seals are subjected to greater wear, particularly the outer edges thereof, it is desirable for them to have the ability to deform radially for maintaining intimate sealing contact with the mating surface as wear occurs. Moreover, since the outer edges of such seals usually wear more rapidly than the mid portion of the seal, it is also desirable to have means for compensating for the greater amount of wear at the outer edges and for maintaining high localized unit load at the outer edges.

SUMMARY AND OBJECTS OF THE INVENTION

Accordingly, an object of this invention is to provide an improved shaft seal for operation in a nonlubricated and an abrasive environment.

Another object of this invention is to provide such an improved shaft seal which will compensate for relatively large shaft deflections.

Another object of this invention is to provide an improved shaft seal of the character described which compensates for wear to either the sealing surface of the seal or to the mating surface and will maintain intimate sealing contact with the mating surface as wear occurs.

According to the present invention, there is provided a shaft seal assembly having an organic plastic sealing ring in sealing contact with a first member and an elastomer load ring positioned in a compressed condition between the sealing ring and a second member. A pair of axially spaced flanges of the sealing ring extend radially toward the second member and movable between first and second positions. At the second position, a greater unit loading is provided at the outer edges of the sealing surface of the sealing ring than at the intermediate portion of the sealing surface. The end faces of the sealing ring are free from contact with adjacent structure at both positions of the flanges.

Other objects and advantages of the present invention will become more readily apparent upon reference to the accompanying drawing and following description.

BRIEF DESCRIPTION OF THE DRAWING

The sole FIGURE is a cross sectional view of a shaft seal embodying the principles of the present invention.

DESCRIPTION OF THE PREFERRED EMBODIMENT

Referring to the drawing, a shaft seal assembly is generally indicated by the reference numeral 10 for sealing the space between a bore 11 of a housing 12 and a peripheral surface of a shaft or pivot pin 13. The seal assembly includes an outer casing 14, an inner sealing ring 16 and an intermediate load ring 17 which is disposed within the casing and encircles the sealing ring.

The outer casing 14 is constructed from a rigid material such as steel or other metallic composition capable of retaining its shape under load. The outer casing has an inner bore 18 to provide a seating surface for the load ring 17 and an outer static sealing surface 19 which, as shown in the drawing, can be sealingly press fitted within the bore 11 of the housing.

The load ring 17 is constructed from an elastomer such as natural rubber, neoprene and the like. An outer surface 21 of the load ring is sealingly seated within the bore 18 of the outer casing 14 and can be either chemically or mechanically bonded thereto. A radially inwardly extending portion 22 of the load ring sealingly encircles the sealing ring. The load ring is maintained in a compressed condition between the casing and the sealing ring 16 for a later defined purpose.

The inner sealing ring 16 has an annular flat-bottomed groove 23 formed on its outer periphery and is defined by a bottom surface 24 disposed substantially parallel to the longitudinal axis of the seal assembly 10 and a pair of side surfaces 26, each of which is angled outwardly from a plane disposed normal to the longitudinal axis of the seal assembly. The surfaces 24 and 26 of the groove cooperate to provide a seating surface for sealingly receiving the radially inwardly extending portion 22 of the load ring 17. Each of the side surfaces is the inner surface of one of a pair of radially outwardly extending flanges 27 disposed at the axial ends of the sealing ring. The base of each flange at the area where the side surface 26 intersects the bottom surface 24 is thicker than the thickness of sealing ring 16 between the bottom surface and a cylindrical sealing surface 28 which is in intimate sealing contact with the shaft 13. An annular groove 29 is formed in the sealing surface 28 intermediate its end faces 30 on the flanges. The sealing surface 28 has a pair of outer edges 31 at opposite ends thereof.

The sealing ring 16 is constructed from an organic plastic or the like having relatively high abrasion resistance and a relatively low friction coefficient when operated in an unlubricated environment. The plastic or like material should also be relatively stiff to temporarily resist being deformed by the force of load ring 17 during assembly onto the shaft and yet have a time dependent deformable characteristic (commonly called "creep") such that if the sealing surface 28 were not in contact with the shaft 13, the sealing ring 16 would be slowly deformed radially inwardly under the sustained force generated by the compressed load ring 17 against the seating surface. (A rigid metal ring, not shown, will be disposed within the sealing ring to prevent deformation of the sealing ring during storage.) Some of the plastics having these features are Teflon (Reg. trademark for a polytetrafloroethylene), nylon with Teflon fill, ultra high molecular weight polyethylene, a relatively hard polyurethane, a polyurethane blended with Teflon or molybdenum disulfide, and the like. Each of these plastics may also be impregnated with filaments or particles of fiberglass in an amount up to approximately 25% of its bulk modulus to increase its resistance to abrasion.

The flanges 27 are movable between a first position as shown by solid lines and a second position as shown by the phantom lines at 27a. The second position 27a is shown in an exaggerated position for illustrative convenience. At the first position, the flanges are at their normal position prior to compression of the load ring 17. At the second position, a greater unit loading is provided at the outer edges 31 than at the sealing surface 28. The end faces 30 are free from contact with adjacent structures at both positions of the flanges.

The free state shape of load ring 17 is shown by the broken lines at 17a with the free state shape of the inwardly extending portion 22 substantially matching the shape of the annular groove 23. The compression of the load ring not only exerts a radial load against the sealing ring but also causes its sides 32 to be protuberated axially outwardly as shown by the solid lines. This exerts an axial force against flanges 27 and with the end faces 30 being free from contact with adjacent structure, the axial force tends to bend them at the intersection of the side surfaces 26 and the bottom surface 24 for moving the flanges from the first position to the second position. This "lever" type action of the flanges causes localized or greater unit loading at the outer edges 31 than at the remainder of the sealing surface 28 to inhibit the initial passage of abrasive particles between the sealing surface and the shaft 13. The annular groove 29 in the sealing surface acts as a trap to entrap dust or other particles that may work their way between the corner portions 31 and the shaft.

In use, the resiliency of the elastomer load ring 17 compensates for deflections and misalignment of the shaft 13 relative to the housing 12 and assures that the sealing surface 28 is maintained in intimate sealing contact with the shaft along the full length of the sealing surface. The time dependent deformation or "creep" characteristic of the plastic sealing ring 16 permits the sealing ring to be deformed radially inwardly in response to the force exerted by the load ring. This maintains intimate sealing contact between the sealing surface 28 and the shaft for an extended period of time as the sealing surface or shaft wears. Such deformation characteristic also permits the flanges 27 to be moved from the first position to the second position in response to the axial force exerted thereon by the load ring so that as wear occurs at the corner portions, the outward bending or "lever" action of the flanges cause the outer edges to deform to maintain sealing contact with the shaft, thereby compensating for the greater amount of wear at the outer edges.

An alternate form of this invention may include omitting the casing 14 and sealingly inserting the load ring 17 within the bore 11 of the housing with the load ring in a compressed condition as described above. Also, a plurality of annular grooves 29 may be provided in the sealing face to provide a multiplicity of dust traps.

Other aspects, objects and advantages of this invention can be obtained from a study of the drawings, the disclosure and the appended claims.

The embodiments of the invention in which an exclusive property of privilege is claimed are defined as follows:

1. In seal assembly for sealing between first and second members, said seal assembly including an organic plastic sealing ring and an elastomeric load ring, said sealing ring having a cylindrical sealing surface in sealing contact with said first member, a pair of axially spaced flanges extending radially toward the second member, an annular groove defined by said flanges and opening toward said second member, a pair of end faces on the flanges, and a pair of outer edges on cylindrical sealing surface adjacent the end faces, said annular groove having a flat bottom surface concentric with said sealing surface, said load ring being seated in said groove and compressed radially between said second member and said sealing ring, wherein the improvement comprises;

said flanges being movable between a first position at which the flanges are at their normal position prior to compression of the load ring and a second position at which a greater unit loading is provided at the outer edges than at the mid portion of the sealing surface, said end faces being free from contact with adjacent structure at both positions of the flanges.

2. The seal assembly of claim 1 wherein said load ring has a cylindrical surface concentric with and seated on the bottom surface of said groove in said sealing ring, and opposite sides abutting the flanges, said sides being protuberated in response to the compression of the load ring for exerting an axial force against the flanges and providing said greater unit loading at the outer edges.

3. The seal assembly of claim 1 or 2 wherein said second member is a casing having a static sealing surface, said elastomer load ring being bonded to said casing.

* * * * *